United States Patent
Sohmshetty et al.

(10) Patent No.: US 10,399,519 B2
(45) Date of Patent: Sep. 3, 2019

(54) VEHICLE BUMPER BEAM WITH VARIED STRENGTH ZONES

(71) Applicant: Ford Global Technologies, LLC, Dearborn, MI (US)

(72) Inventors: Raj Sohmshetty, Canton, MI (US); Rohit Telukunta, Madison Heights, MI (US); Saied Nusier, Canton, MI (US); Mohamed Ridha Baccouche, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 117 days.

(21) Appl. No.: 15/625,475

(22) Filed: Jun. 16, 2017

(65) Prior Publication Data

US 2018/0361964 A1    Dec. 20, 2018

(51) Int. Cl.
| | |
|---|---|
| *B60R 19/03* | (2006.01) |
| *B60R 19/34* | (2006.01) |
| *C21D 1/18* | (2006.01) |
| *C21D 1/673* | (2006.01) |
| *C21D 8/02* | (2006.01) |
| *B21D 22/02* | (2006.01) |
| *B21D 37/16* | (2006.01) |

(Continued)

(52) U.S. Cl.
CPC ............ *B60R 19/03* (2013.01); *B21D 22/022* (2013.01); *B21D 37/16* (2013.01); *B21D 53/88* (2013.01); *B60R 19/18* (2013.01); *B60R 19/34* (2013.01); *C21D 1/18* (2013.01); *C21D 1/673* (2013.01); *C21D 8/0294* (2013.01); *B60R 2019/1826* (2013.01); *C21D 2211/008* (2013.01); *C21D 2221/01* (2013.01)

(58) Field of Classification Search
CPC .......... B60R 19/03; B60R 19/04; B60R 19/34
USPC ................. 296/187.09, 187.1; 293/133, 154
See application file for complete search history.

(56) References Cited

U.S. PATENT DOCUMENTS

| | | | |
|---|---|---|---|
| 6,435,298 B1 | 8/2002 | Mizuno et al. | |
| 7,461,874 B2 * | 12/2008 | Guiles | B60R 19/18 29/897.2 |
| 7,678,208 B2 | 3/2010 | Bodin | |

(Continued)

FOREIGN PATENT DOCUMENTS

| | | |
|---|---|---|
| WO | 2016046637 A1 | 3/2016 |
| WO | 2016097224 A1 | 6/2016 |
| WO | 2017015280 A1 | 1/2017 |

OTHER PUBLICATIONS

R. Kolleck, R. Veit, "Tools and Technologies for Hot Forming with Local Adjustment of Part Properties," Materials Science Forum, vols. 638-642, pp. 3919-3924, 2010.

*Primary Examiner* — Jason S Morrow
(74) *Attorney, Agent, or Firm* — Brooks Kushman P.C.

(57) ABSTRACT

A bumper assembly may include a pair of crush cans and a bumper beam. The pair of crush cans are for securing to a vehicle body. The bumper beam is secured to the crush cans and includes a first end and a second end each extending outboard of one of the crush cans, and a middle portion extending between the first and second ends. The bumper beam is thermally treated to provide the first and second ends with less tensile strength than the middle portion. The middle portion may have a tensile strength between 1000 MPa and 1900 MPa. Each of the first and second ends may have a tensile strength between 600 MPa and 900 MPa.

17 Claims, 5 Drawing Sheets

(51) Int. Cl.
    *B21D 53/88*     (2006.01)
    *B60R 19/18*     (2006.01)

(56) References Cited

U.S. PATENT DOCUMENTS

| | | |
|---|---|---|
| 8,118,954 B2 | 2/2012 | Beenken et al. |
| 8,382,199 B2 | 2/2013 | Bodin |
| 8,691,032 B2 | 4/2014 | Thomas et al. |
| 8,770,636 B2 * | 7/2014 | Shimotsu ............... B60R 19/18 293/102 |
| 9,039,073 B2 | 5/2015 | Yajima et al. |
| 9,283,908 B2 | 3/2016 | Blumel et al. |
| 9,308,564 B2 | 4/2016 | Potocki et al. |
| 9,359,663 B2 | 6/2016 | Mizuta et al. |
| 2002/0113447 A1 * | 8/2002 | Frank ..................... B60R 19/34 293/133 |
| 2009/0045638 A1 | 2/2009 | Handing et al. |
| 2012/0304448 A1 | 12/2012 | Hartmann et al. |
| 2013/0136945 A1 | 5/2013 | Charest et al. |
| 2014/0070552 A1 * | 3/2014 | Shimotsu ............... C21D 1/673 293/102 |
| 2014/0152029 A1 * | 6/2014 | Taniguchi ............. B60R 19/18 293/102 |
| 2015/0069770 A1 * | 3/2015 | Hashimoto ............ B60R 19/18 293/102 |
| 2016/0144814 A1 * | 5/2016 | Ahn ....................... B23K 9/16 293/133 |
| 2017/0051371 A1 | 2/2017 | Chauvin et al. |
| 2018/0126934 A1 * | 5/2018 | Nagayama ............. B60R 19/04 |
| 2018/0251174 A1 * | 9/2018 | Kamiya ................. B60R 19/04 |
| 2018/0257589 A1 * | 9/2018 | Kawamura ............ B60R 19/34 |

* cited by examiner

VEHICLE BUMPER BEAM WITH VARIED STRENGTH ZONES

TECHNICAL FIELD

The present disclosure relates to a vehicle bumper beam assembly having varied strength zones and a method for manufacturing the same.

BACKGROUND

Automotive manufacturers are driven to design light weight vehicles with increased crash performance and reduced fuel consumption. The manufacturers have transitioned from a usage of mild steels for vehicle components to advanced high strength steels and ultra-high strength steels along with aluminum. Hot stamping processes for vehicle components allow creation of fully martensitic structures. However, hot stamping process may create vehicle components with undesirable qualities. For example, a bumper beam assembly having uniform microstructures in each of the components may have undesired impact deformation characteristics or undesired characteristics relating to securing the components to one another.

This disclosure is directed to solving the above problems and other problems as summarized below.

SUMMARY

A bumper assembly includes a pair of crush cans and a bumper beam. The pair of crush cans are for securing to a vehicle body. The bumper beam is secured to the crush cans and includes a first end and a second end each extending outboard of one of the crush cans, and a middle portion extending between the first and second ends. The bumper beam is thermally treated to provide the first and second ends with less tensile strength than the middle portion. The middle portion may have a tensile strength between 1000 MPa and 1900 MPa. Each of the first and second ends may have a tensile strength between 600 MPa and 900 MPa. Each of the first end and the second end may be of a tensile strength to provide deformation substantially equal to a width of the bumper beam when subjected to an impact force between 5,000 and 15,000 pounds. Each of a pair of bumper supports may be disposed between one of the pair of crush cans and the bumper beam. The first end and the second end may define medium strength zones in which the tensile strength of each of the ends provides for an amount of deformation to absorb energy greater than an amount of deformation to absorb energy of the middle portion when subjected to an impact. Each of the first end and the second end may extend inboard relative to an adjacent crush can up to one inch. Each of the crush cans may have a length substantially equal to approximately seven inches.

A bumper assembly includes a first crush can, a first bumper support, and a bumper beam. The first crush can is for securing to a portion of a vehicle body. The first bumper support is mounted to the first crush can. The bumper beam is mounted to the first bumper support and includes a thermally treated first medium strength zone extending along the bumper beam inboard and outboard of the first crush can. The bumper assembly may further include a second crush can and a second bumper support. The second crush can may be spaced from the first crush can and be for securing to another portion of the vehicle body. The second bumper support is mounted to the second crush can. The bumper beam may further include a thermally treated second medium strength zone extending inboard and outboard of the second crush can. The bumper beam may further include a thermally treated hard strength zone extending between the first medium strength zone and the second medium strength zone. The first medium strength zone may be further defined as a zone in which a microstructure includes portions of one or more of ferrite, pearlite, martensite, and bainite. The hard strength zone may be further defined as a zone including a fully martensitic structure. The bumper beam may be thermally treated to define a hard strength zone extending inboard from the first medium strength zone. The hard strength zone may be heated during thermal treatment to have a tensile strength between 1000 MPa and 1900 MPa. The first medium strength zone may be of a tensile strength to provide bumper beam deformation substantially equal to a width of the bumper beam when subjected to an impact force between 5,000 and 15,000 pounds. The first crush can may have a length of approximately seven inches. The first medium strength zone may extend inboard relative to an adjacent crush can up to one inch.

A method to create a vehicle bumper beam includes heating a portion of a blank to a first temperature to define a first strength zone; heating a second portion of the blank to a second temperature to define a second strength zone; and transferring the blank after heating to a die to form a vehicle bumper beam. The second strength zone is a medium strength zone for spanning inboard and outboard on either side of a vehicle crush can supporting the bumper beam. The first temperature may be above an upper critical temperature of the blank. The second temperature may be between a lower critical temperature and an upper critical temperature of the blank.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
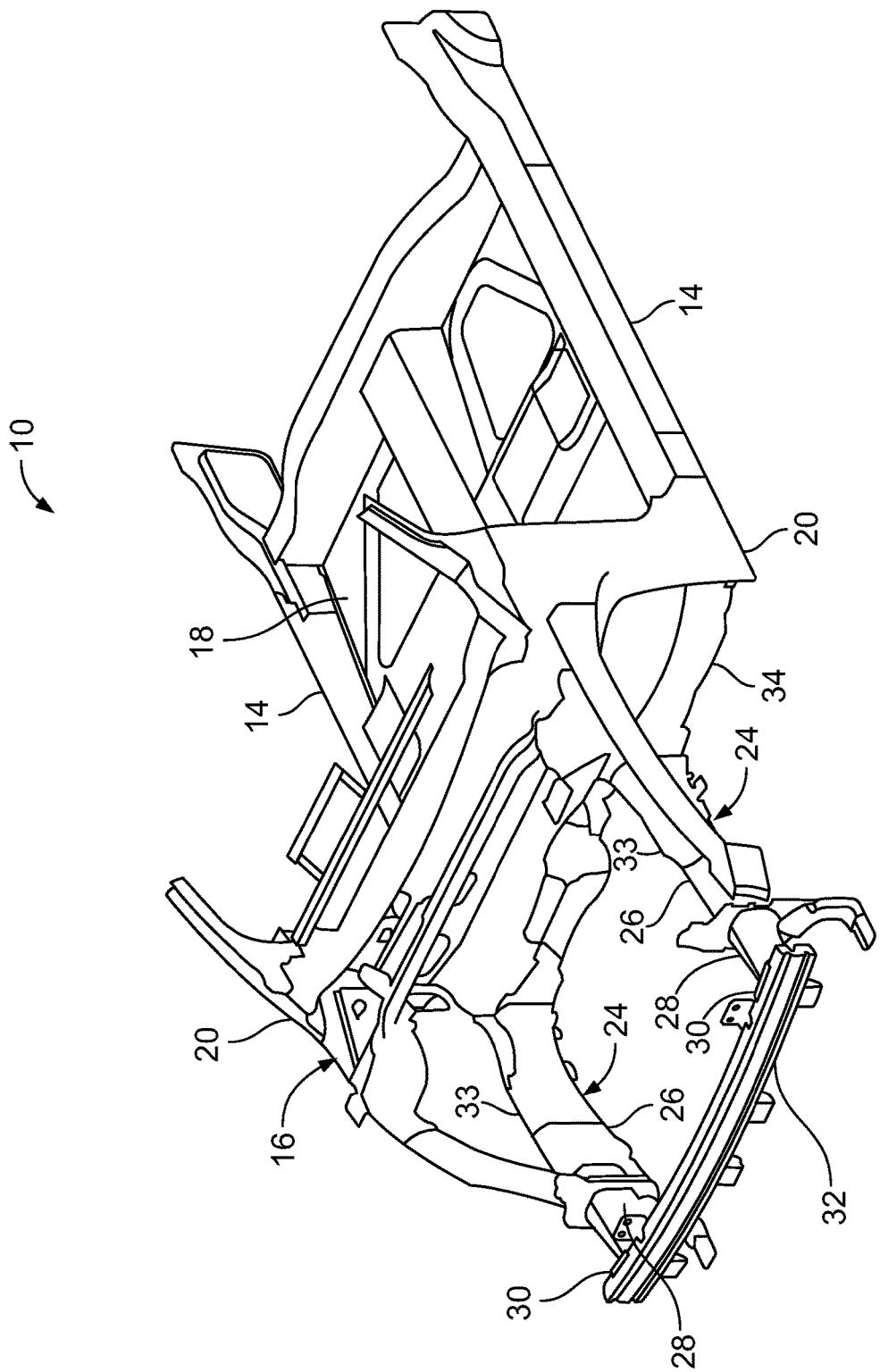
FIG. 1 is a perspective view of an example of a vehicle body.

FIG. 1 shows an example of a portion of a vehicle body, generally referred to as a vehicle body 10 herein. The vehicle body 10 includes a pair of rockers 14 and an engine compartment 16. A floor panel member 18 is disposed between the pair of rockers 14. The floor panel member 18 and the pair of rockers 14 may assist in supporting a vehicle cabin. Each of the rockers 14 is secured to the engine compartment 16 by one of a pair of hinge pillars 20. The engine compartment 16 includes a pair of underbody assemblies 24. Each of the underbody assemblies 24 includes a front rail 26, a crush can 28, a bumper support 30, a bumper beam 32, a mid-rail 33, and a backup structure 34. The bumper beam 32 assists in protecting vehicle occupants. While shown positioned at a rear portion of the vehicle body 10, the bumper beam 32 may also be located at a rear portion of the vehicle body 10. For example, the bumper beam 32 absorbs and manages impact energy by deforming when subjected to an impact. The crush cans 28, the bumper supports 30, and the bumper beam 32 comprise a bumper assembly. Each of the crush cans 28 may be secured to one of the front rails 26. Each of the bumper supports 30 may be disposed between the bumper beam 32 and the crush cans 28. Each of the backup structures 34 may span between the front rail 26 and the hinge pillar 20.

Each of the crush cans 28 may be made of a high strength low-alloy steel (HLSA) 350, dual phase (DP) 600, or DP780 in an assembly of multiple stamped components which are spot welded to one another. Alternatively, each of the crush cans 28 may be formed as a single component with the respective front rail 26. The bumper beam 32 may be made of boron or martensitic steels formed in a hot stamping process including a thermal treatment. Each of the backup structures 34 may be made of higher strength steels such as DP980, DP1180, or hot stamped boron steels. Each of the front rails 26 may be hollow tubes made HLSA350, DP600, or DP780 manufactured using hydroforming or multiple stamped pieces.

Figure 2:
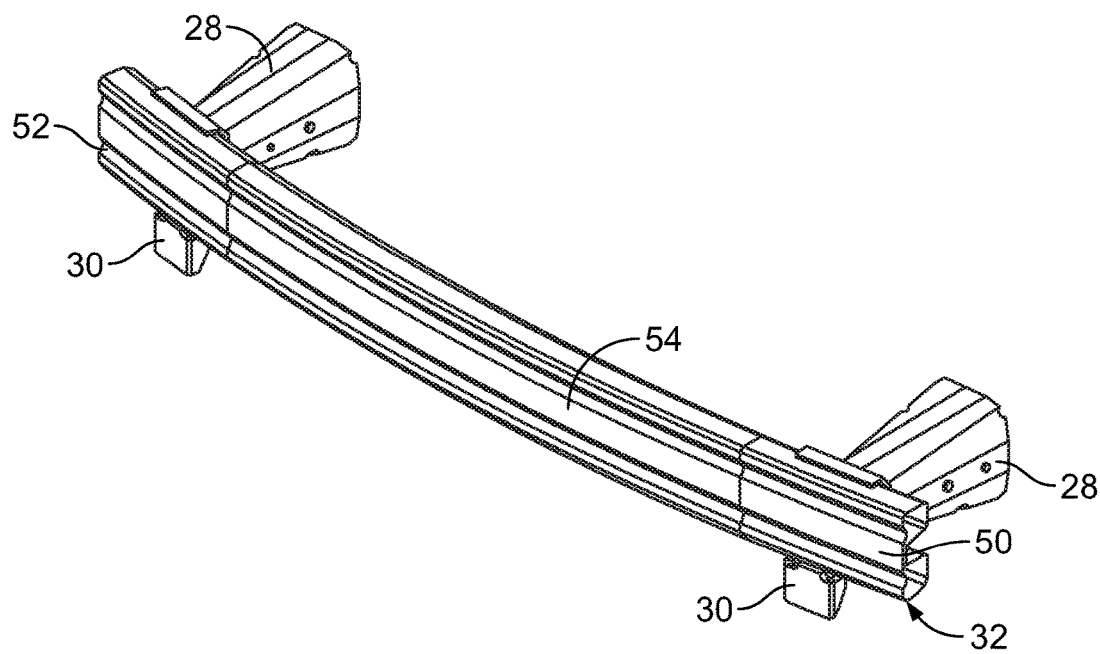
FIG. 2 is a perspective view of an example of a bumper assembly of the vehicle body of FIG. 1.
Figure 3:
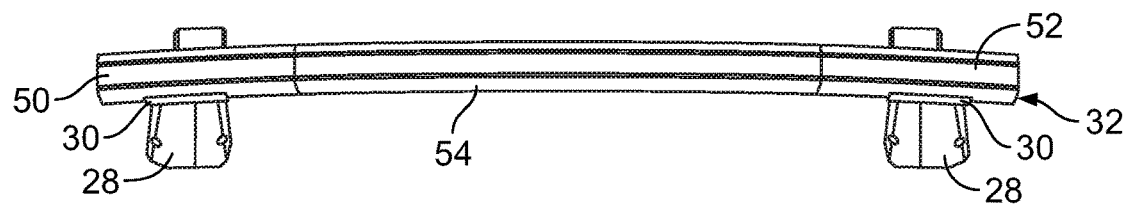
FIG. 3 is a top plan view of the bumper assembly of FIG. 2.

FIGS. 2 and 3 show the bumper assembly in further detail. The bumper beam 32 may be formed by a monolithic hot stamping and cooling process (further described below) to obtain various strength zones along the bumper beam 32. For example, the bumper beam 32 includes a first end 50, a second end 52, and a middle portion 54 extending between the first end 50 and the second end 52. The first end 50 extends inboard and outboard of one of the crush cans 28. The second end 52 extends inboard and outboard of the other of the crush cans 28. Each of the first end 50 and the second end 52 may extend inboard relative to one of the respective crush cans 28 a length up one inch.

Prior art examples of bumper beams may have a uniform martensitic structure which may prevent desired deformation when subjected to an impact. Selectively located and varied strength zones along the bumper beam 32 may assist in achieving desired deformation resulting from an impact. For example, the first end 50 and the second end 52 may be thermally treated to define medium strength zones having a tensile strength less than 1000 MPa. The middle portion 54 may be thermally treated to define a hard strength zone having a tensile strength between 1000 MPa and 1900 MPa. The zone identifiers may be defined by a microstructure made available on a vehicle component due to the thermal treatment. For example, a hard strength zone may have a fully martensitic microstructure, a soft strength zone may have a ferrite and/or pearlite microstructure, and a medium strength zone may have a microstructure including of one or more of ferrite, pearlite, martensite, and bainite.

Portions of a blank may be heated to define the different strength zones through either uniform or tailored heating. With uniform heating, the blank may be heated above an austenetizing temperature, referred to as Ac3. A temperature range associated with Ac3 may be between 800 and 850 degrees Celsius. With tailored heating, different portions of the blank may be heated to different temperatures to define the various strength zones, such as hard, medium, and soft.

Alternatively, portions of a blank may be cooled to define different strength zones. The hard strength zone may be quenched above a critical cooling rate, such as a rate of 100 degrees Celsius per second (C/s). The critical cooling rate is a minimum continuous cooling rate to prevent undesired phase transformation of the blank. A medium strength zone may be a zone including a partially austenitized portion cooled at a rate below the critical cooling rate, such as a rate between 10 and 30 C/s. The medium strength zone assists in distributing stress from an impact and assists in maximizing plastic strain energy of the bumper beam 32. Further, the lower strength of the medium strength zone facilitates an easier weld of the crush cans 28 or bumper supports 30 to the bumper beam 32 in comparison to an increased hard strength zone. A reduced strength zone may be a zone in which the component has characteristics as delivered and in which the component is not austenitized.

Thermally treating the first end 50 and the second end 52 as medium strength zones will allow the bumper beam 32 to selectively deform when subjected to an impact and provide additional crush distance in front of the respective crush can 28 to absorb energy from an impact to the bumper beam 32. If the bumper beam 32 is not thermally treated with different strength zones, the bumper beam 32 may not deform appropriately to dissipate energy when subjected to an impact. In the example without different strength zones, the bumper beam 32 may intrude into the crush cans 28 resulting in higher forces and energy for the crush cans 28 to absorb. This approach does not hold the crush cans 28 and the bumper beam 32 together as a single entity at higher loads resulting in system failure.

Figure 4:
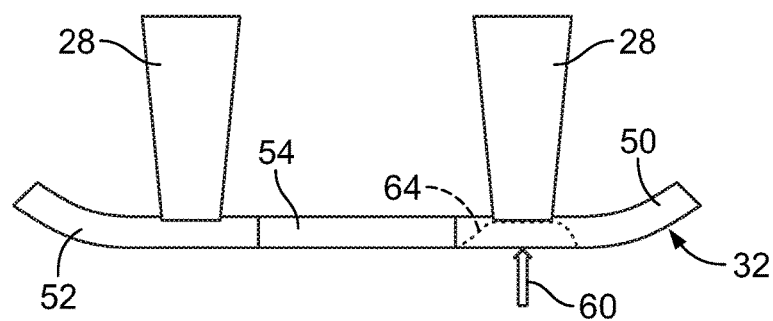
FIG. 4 is a diagrammatic plan view of an example of a portion of a bumper assembly.

FIG. 4 is a schematic diagram of a portion of the bumper assembly including the bumper beam 32. An impact to the bumper beam 32 is represented by force arrow 60. Broken line 64 shows one example of deformation, a deformation of approximately one inch, to the first end 50 resulting from the impact represented by force arrow 60. This deformation is made possible due to characteristics of the first end 50 being thermally treated to form a medium strength zone. For example, the bumper beam 32 may deform substantially a width of the bumper beam 32 when subjected to an impact force between 5,000 and 15,000 pounds. In comparison, thermally treating the first end 50 to form a hard strength zone would minimize or prevent deformation of the bumper beam 32 at the first end 50 when the impact is received. Thus, treating the first end 50 of the bumper beam 32 to form a medium strength zone provides for additional crush distance or deformation when an impact is received in comparison to a hard strength zone.

Thermally treating the middle portion 54 to form a hard strength zone may assist in facilitating load transfers from the first end 50 to the second end 52. For example, when the bumper beam 32 is subjected to an impact such as receiving a force represented by force arrow 60 in FIG. 4, the hard strength zone may enable a transfer of the received force from the impacted end to the non-impacted end to provide better yielding and thus reducing energy transferred to the crush cans 28. The thermally treated bumper beam 32 with different strength zones provides for the bumper beam 32 and crush cans 28 to operate as a single entity so that energy received from impact reaches the rails more uniformly.

A reduction in an overhang length is an additional advantage to using the bumper beam 32 having different strength zones. Overhang in this context may be defined as a length in a longitudinal direction (fore/aft) of the vehicle from a forward portion of the bumper beam 32 to a center of a front vehicle tire. In one example, the overhang length may be substantially equal to twenty-five inches including a crush can having a length of eight inches. The bumper beam 32 having different strength zones provides for an additional one inch for the overhang length since the bumper beam 32 may be deformed inboard approximately one inch prior to transferring energy from an impact to the crush cans 28. As a result, each of the crush cans 28 may have a length of seven inches instead of eight inches to reduce the overhang length. This reduction in overhang length provides benefits relating to a weight of the vehicle and aesthetics.

Figure 5:
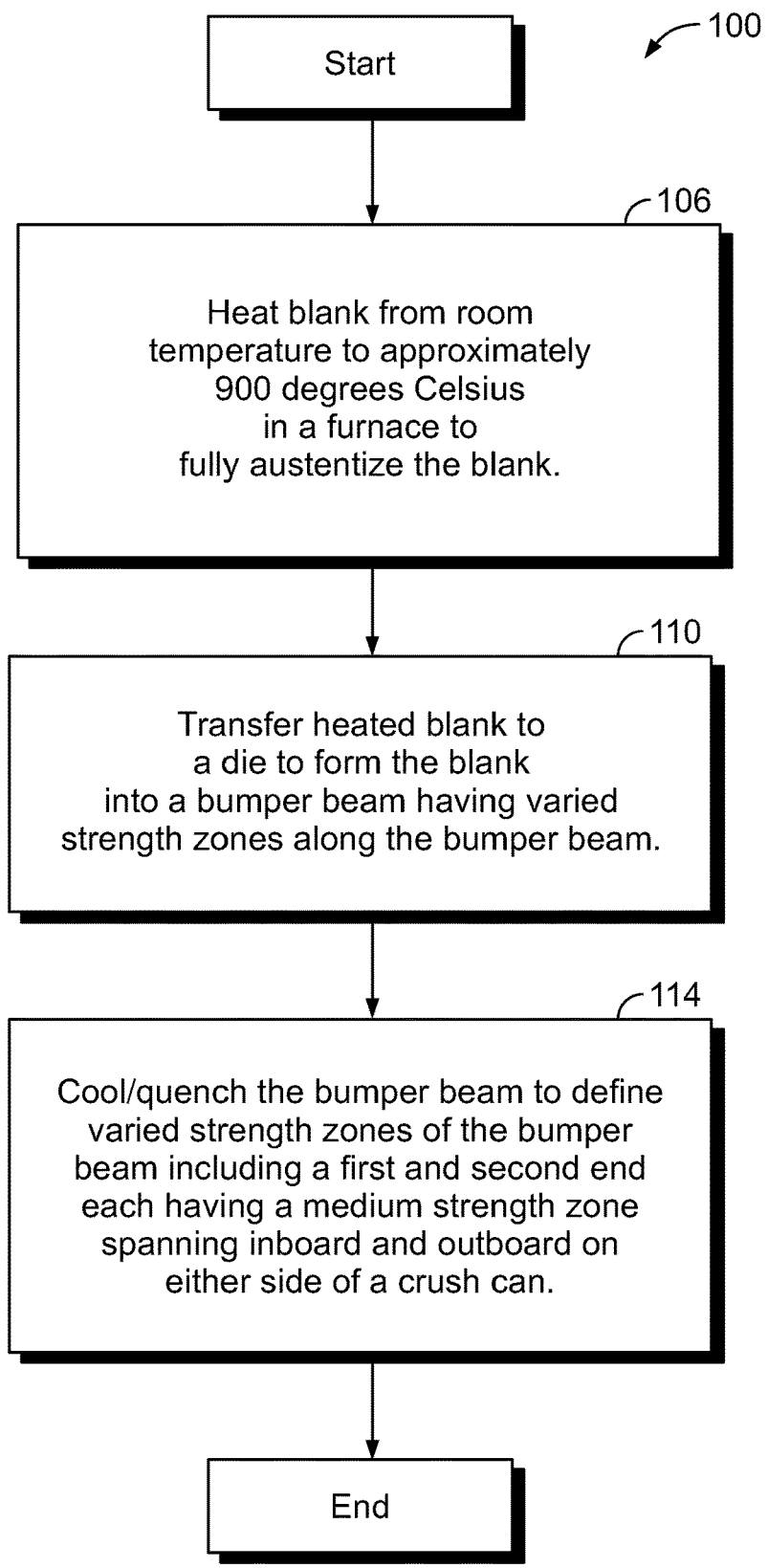
FIG. 5 is a flow chart showing an example of a method for creating a vehicle component.

FIG. 5 is a flow chart illustrating an example of a method of thermally treating a blank using a monolithic hot stamping process, referred to generally as a method 100. As mentioned above, the bumper beam 32 may be formed by a monolithic hot stamping process. For example, in operation 106 a blank may be heated from room temperature to approximately 900 degrees Celsius in a furnace to fully austenitize the blank. In operation 110, the heated blank may then be transferred to a die where the blank may be formed into a desired shape and rapidly cooled. In one example, the blank may be formed into a bumper beam, such as the bumper beam 32. The blank may have a temperature of approximately 700 to 800 degrees Celsius and may be positioned within the die for cooling a portion of the blank at approximately 100 degrees C./s to achieve a hard strength zone and another portion at approximately 30 C/s to achieve a medium strength zone. Cooling the blank at the critical cooling rate results in achieving a fully martensitic structure for the hard strength zone to achieve a tensile strength of approximately 1300 to 1600 MPa. Cooling the blank at a rate below the critical cooling rate to achieve the medium strength zone results in a tensile strength of approximately 600 MPa to 900 MPa. Cooling times may vary based on a thickness and type of the blank.

In operation 114, the cooling process may be an annealing process or a quenching process. The annealing process is a slower process to use when equilibrium structures are desired. The quenching process is a faster process to use when non-equilibrium structures are desired. A typical hot stamping process may use the quenching process by applying water to the heated blank when positioned within the die. Portions of a bumper beam may be cooled at different rates to define varied strength zones including a medium strength zone at either end of the bumper beam and a hard strength zone at a middle portion of the bumper beam extending between the ends.

Figure 6:
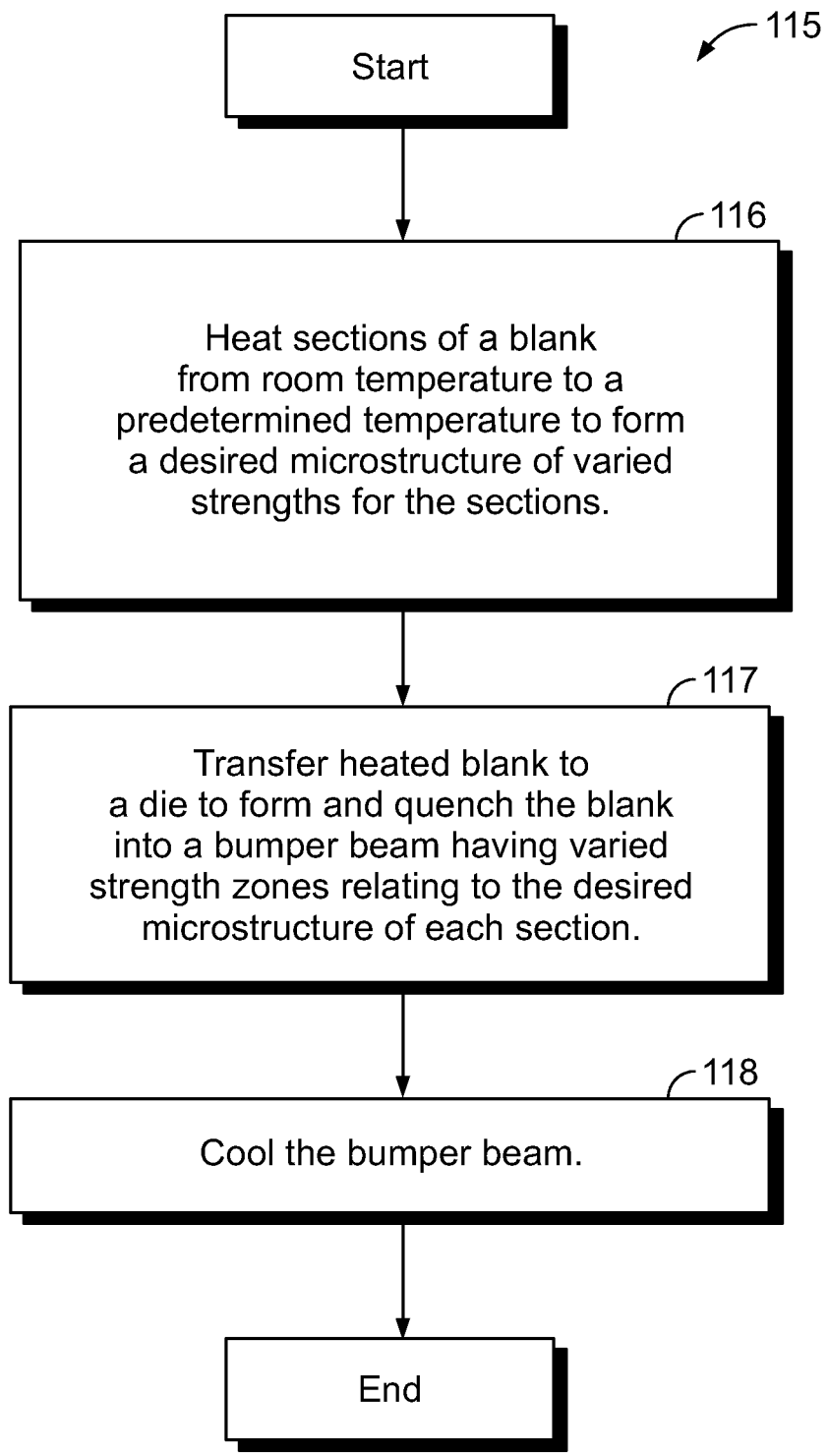
FIG. 6 is a flow chart showing an example of another method for creating a vehicle component.

FIG. 6 is a flow chart illustrating an example of a method of thermally treating a blank using a monolithic hot stamping process, referred to generally as a method 115. In operation 116, sections of a blank may be heated to a predetermined temperature to achieve a desired microstructure of varied strength for the sections. For example, one or more portions of the blank may be treated to a temperature above 900 degrees Celsius to achieve characteristics of a hard strength zone. A desired microstructure associated with the hard strength zone may be martensitic. One or more portions of the blank may be treated to a temperature between 700 and 900 degrees Celsius to achieve characteristics of a medium strength zone. A desired microstructure associated with the medium strength zone may include one or more of ferrite, pearlite, martensite and bainite. One or more portions of the blank may be treated to a temperature below 700 degrees Celsius to achieve characteristics of a soft strength zone. A desired microstructure associated with a soft strength zone may be ferrite and/or pearlite.

In operation 117, the heated blank may then be transferred to a die where the blank may be formed into a desired shape. In one example, the blank may be formed into a bumper beam for a vehicle assembly having varied strength zones, such as the bumper beam 32.

In operation 118, the cooling process may be an annealing process or a quenching process. The annealing process is a slower process to use when equilibrium structures are desired. The quenching process is a faster process to use when non-equilibrium structures are desired. A typical hot stamping process may use the quenching process by applying water to the heated blank when positioned within the die. In operation 118, the bumper beam 32 may be cooled by either a uniform cooling or a cooling tailored to portions of the blank.

Figure 7:
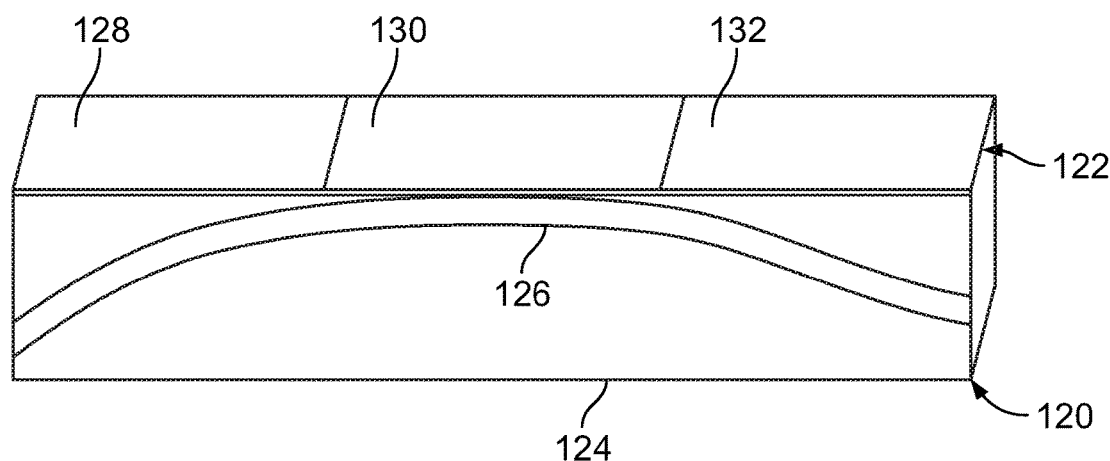
FIG. 7 is an illustrative schematic diagram showing an example of a die assembly and a blank.

FIG. 7 is a schematic diagram showing an example of a die assembly 120 supporting a blank 122. The cooling portion of the hot stamping process may also use spacing between the blank and a cooling channel to obtain varied strength zones. A die 124 may include a coolant channel 126. The coolant channel 126 may be shaped within the die 124 to have varied spacing from the blank 122 to achieve varied material structures and strength zones of the blank 122. The blank 122 may have uniform properties across the blank 122 prior to being positioned with the die 124. Portions of the blank 122 located closer to the coolant channel 126 are subject to rapid cooling/quenching to obtain a martensitic structure. Portions of the blank 122 located further away from the coolant channel 126 are subject to a slower cooling/quenching to obtain a pearlite structure. In this example, the spacing and shape of the coolant channel 126 relative to the blank 122 may result in having a first pearlite portion 128, a martensitic portion 130, and a second pearlite portion 132.

Figure 8:
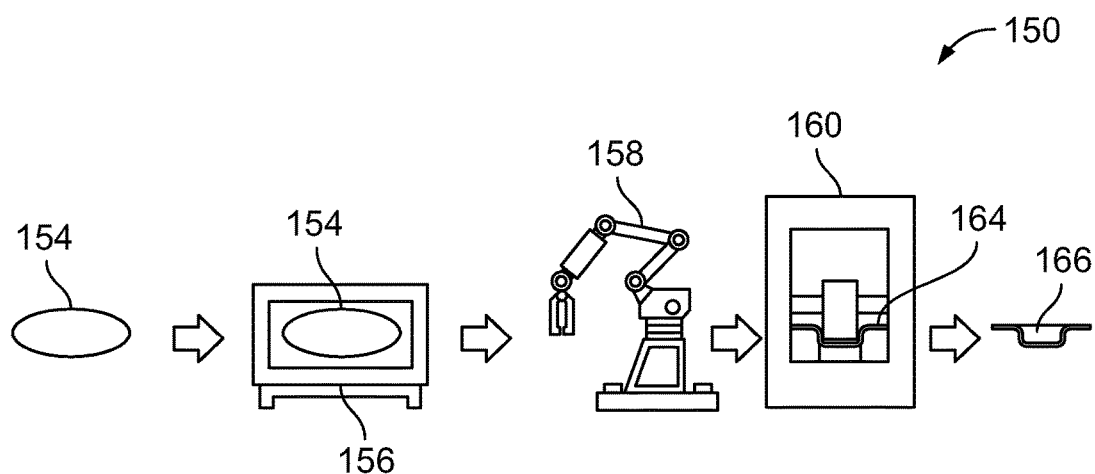
FIG. 8 is a diagrammatic view of an example of a hot stamping process.

FIG. 8 is a diagrammatic view of an example of a hot-stamping line that may be used to manufacture an DHSS vehicle body component, referred to generally herein as a hot-stamping process 150. Hot-stamping, also known as hot forming or press-hardening, is a process of stamping a blank while the metal is very hot, usually in excess of 600 degrees Celsius, and subsequently quenching the formed blank in a closed die. The hot-stamping process may convert low-strength blanks to high-strength components as described above. For example, the finished component may have a yield strength of about 150 to 230 kilo pounds per square inch.

In the hot-stamping process 150, a boron steel blank 154 (which may be press-hardenable steel) is placed in a furnace 156 and heated above a phase transformation temperature forming austenite. The phase transformation temperature is the transformation temperature at which ferrite fully transforms into austenite. For example, the blank 154 may be heated at 900 to 950 degrees Celsius for a predetermined time in the furnace 156. The bake time and furnace temperature may vary depending on the material of the blank 154 and desired properties of the finished part. After heating, a robotic transfer system 158 may transfer the blank 154, now austenitized, to a press 160 having a die 164. The die 164 stamps the blank 154 into a desired shape while the blank 154 is still hot to form one or more components 166 from the blank 154. The component 166 is then quenched while the die 164 is still closed using water or other coolant as described above. Quenching is provided at a cooling speed of 30 to 150 C/s for a predetermined duration at the bottom of the stroke. Quenching changes the microstructure of the blank from austenite to martensite. After quenching, the component 166 is removed from the press 160 while the component is still hot (e.g., about 150 degrees Celsius). The component 166 may then be cooled on racks.

A hot-stamping process may provide numerous advantages over other high-strength steel forming methods such as cold-stamping. One advantage of hot-stamping is a reduced spring back and warping of the blank. Hot-stamping also allows complex shapes to be formed in a single stroke of the die to reduce downstream processing and increase efficiency in the manufacturing of the vehicle component from the blank.

Hot-stamped components may be both lightweight and strong. Examples of automotive components that may be formed by hot-stamping may include: body pillars, rockers, rails, bumpers, intrusion beams, carrier understructure, mounting plates, front tunnels, front and rear bumpers, reinforcement members, and side rails. Higher strength zones of the components provide increased resistance to deformation during an impact while softer strength zones may be placed in locations where the component is to be attached to other components or where deformation is desired.

While example embodiments are described above, it is not intended that these embodiments describe all possible forms encompassed by the claims. The words used in the specification are words of description rather than limitation, and it is understood that various changes can be made without departing from the spirit and scope of the disclosure. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle bumper assembly comprising:
a pair of crush cans for securing to a vehicle body; and
a bumper beam secured to the crush cans at a first beam surface of a first end and a second beam surface of a second end each end extending inboard and outboard of one of the crush cans, and a middle portion extending between the first and second ends,
wherein the bumper beam is thermally treated to provide the first and second ends with less tensile strength than the middle portion.

2. The assembly of claim 1, wherein the middle portion has a tensile strength between 1000 MPa and 1900 MPa.

3. The assembly of claim 1, wherein each of the first and second ends has a tensile strength between 600 MPa and 900 MPa.

4. The assembly of claim 1, wherein each of the first end and the second end is of a tensile strength to provide deformation substantially equal to a width of the bumper beam when subjected to an impact force between 5,000 and 15000 pounds.

5. The assembly of claim 1 further comprising a pair of bumper supports each disposed between one of the pair of crush cans and the bumper beam.

6. The assembly of claim 1, wherein the first end and the second end are formed to define a strength zone in which the tensile strength of each of the ends provides for an amount of deformation to absorb energy greater than an amount of deformation to absorb energy of the middle portion when subjected to an impact.

7. The assembly of claim 1, wherein each of the first end and the second end extend inboard relative to an adjacent crush can up to one inch.

8. The assembly of claim 1, wherein each of the crush cans has a length substantially equal to approximately seven inches.

9. A bumper assembly comprising:
a first crush can for securing to a portion of a vehicle body;
a first bumper support mounted to the first crush can;
a second crush can spaced from the first crush can for securing to another portion of the vehicle body;
a second bumper support mounted to the second crush can; and
a bumper beam mounted to the first bumper support at a first beam surface and including:
a thermally treated first strength zone extending along the bumper beam inboard and outboard of the first beam surface;
a thermally treated second strength zone extending inboard and outboard of the second crush can; and
a thermally treated third strength zone extending between the first strength zone and the second strength zone, wherein the third strength zone is of a tensile strength greater than the first strength zone and a tensile strength of the second strength zone.

10. The assembly of claim 9, wherein the first strength zone is further defined as a zone in which a microstructure includes portions of one of more of ferrite, pearlite, martensite, and bainite, and wherein the third strength zone is further defined as a zone including a fully martensitic structure.

11. The assembly of claim 9, and wherein the third strength zone is heated during thermal treatment to have a tensile strength between 1000 MPa and 1900 MPa.

12. The assembly of claim 9, wherein the first strength zone is of a tensile strength to provide bumper beam deformation substantially equal to a width of the bumper beam when subjected to an impact force between 5,000 and 15,000pounds.

13. The assembly of claim 9, wherein the first crush can has a length of approximately seven inches.

14. The assembly of claim 9, wherein the first strength zone extends inboard relative to an adjacent crush can up to one inch.

15. A method to create a vehicle bumper beam comprising:
heating a portion of a blank to a first temperature to define a first strength zone;

heating a second portion of the blank to a second temperature to define a second strength zone; and transferring the blank after heating to a die to form a vehicle bumper beam, wherein the second strength zone spans inboard and outboard on either side of a vehicle crush can supporting the bumper beam and includes a microstructure having one or more of ferrite, pearlite, martensite, and bainite.

16. The method of claim 15, wherein the first temperature is above an upper critical temperature of the blank.

17. The method of claim 15, wherein the second temperature is between a lower critical temperature and an upper critical temperature of the blank.

* * * * *